United States Patent
Lang et al.

(10) Patent No.: US 9,994,456 B2
(45) Date of Patent: *Jun. 12, 2018

(54) METHOD AND DEVICE FOR PRODUCING POLYCHLOROSILANES

(71) Applicants: Juergen Erwin Lang, Karlsruhe (DE); Hartwig Rauleder, Rheinfelden (DE); Ekkehard Mueh, Rheinfelden (DE); Imad Moussallem, Hanau (DE)

(72) Inventors: Juergen Erwin Lang, Karlsruhe (DE); Hartwig Rauleder, Rheinfelden (DE); Ekkehard Mueh, Rheinfelden (DE); Imad Moussallem, Hanau (DE)

(73) Assignee: Evonik Degussa GmbH, Essen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/782,470

(22) PCT Filed: Mar. 4, 2014

(86) PCT No.: PCT/EP2014/054116
§ 371 (c)(1),
(2) Date: Oct. 5, 2015

(87) PCT Pub. No.: WO2014/173573
PCT Pub. Date: Oct. 30, 2014

(65) Prior Publication Data
US 2016/0039681 A1    Feb. 11, 2016

(30) Foreign Application Priority Data

Apr. 24, 2013   (DE) .................. 10 2013 207 444

(51) Int. Cl.
C01B 33/107    (2006.01)
B01J 19/08    (2006.01)
C08G 77/60    (2006.01)

(52) U.S. Cl.
CPC ....... C01B 33/10773 (2013.01); B01J 19/088 (2013.01); C08G 77/60 (2013.01);
(Continued)

(58) Field of Classification Search
CPC . C01B 33/107; C01B 33/03; C01B 33/10773; B01J 19/087; B01J 2219/0875; B01J 2219/0898
(Continued)

(56) References Cited

U.S. PATENT DOCUMENTS 4,321,246 A * 3/1982 Sarma ................... C01B 33/107
                                                    136/258
8,177,943 B2 * 5/2012 Auner ................... C08G 77/60
                                                    204/157.44
(Continued)

FOREIGN PATENT DOCUMENTS

CN    101298457 A    11/2008
CN    102666381 A    9/2012
(Continued)

OTHER PUBLICATIONS

U.S. Appl. No. 14/782,247, filed Oct. 2, 2015, Lang et al.
(Continued)

*Primary Examiner* — Ngoc-Yen Nguyen
(74) *Attorney, Agent, or Firm* — Oblon, McClelland, Maier & Neustadt, L.L.P.

(57) ABSTRACT

The invention relates to a process and an apparatus for preparation of polychlorosilanes from monomeric chlorosilanes, by subjecting the chlorosilanes to a thermal plasma.

9 Claims, 4 Drawing Sheets

Figure 1:
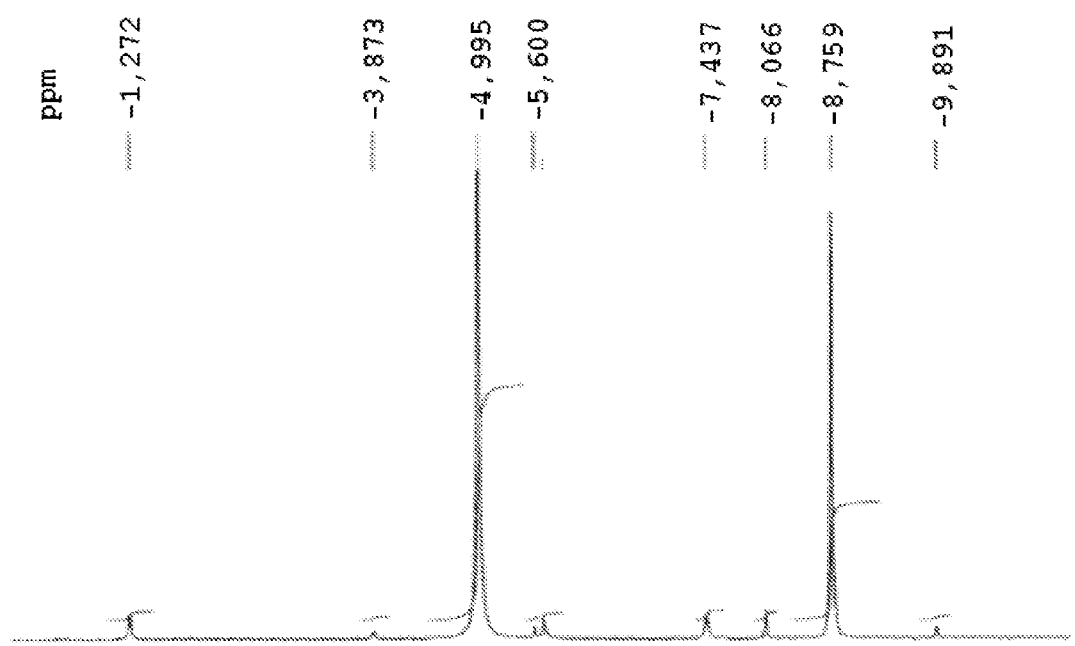

(52) U.S. Cl.
CPC .............. *B01J 2219/0805* (2013.01); *B01J 2219/0871* (2013.01); *B01J 2219/0883* (2013.01); *B01J 2219/0898* (2013.01); *Y02P 20/582* (2015.11)

(58) Field of Classification Search
USPC .................................................. 423/341, 342
See application file for complete search history.

(56) References Cited

U.S. PATENT DOCUMENTS

| | | | | |
|---|---|---|---|---|
| 2009/0127093 | A1* | 5/2009 | Auner ............... | B01J 19/088 204/157.44 |
| 2009/0169457 | A1* | 7/2009 | Auner ............... | C01B 33/027 423/342 |
| 2010/0080746 | A1 | 4/2010 | Lang et al. | |
| 2010/0160591 | A1* | 6/2010 | Tebakari .............. | C01B 33/03 528/10 |
| 2011/0150739 | A1* | 6/2011 | Seliger ............... | C01B 33/03 423/341 |
| 2012/0145533 | A1 | 6/2012 | Auner | |
| 2013/0039830 | A1 | 2/2013 | Auner et al. | |
| 2013/0043893 | A1 | 2/2013 | Mueh et al. | |
| 2014/0178284 | A1 | 6/2014 | Lang et al. | |

FOREIGN PATENT DOCUMENTS

| | | |
|---|---|---|
| DE | 10 2005 024 041 | 11/2006 |
| DE | 10 2007 007 874 | 8/2008 |
| JP | 2004 224591 | 8/2004 |
| JP | 4832511 B2 | 9/2011 |
| KR | 10-2009-0115725 A | 11/2009 |
| KR | 10-2011-0043545 A | 4/2011 |
| WO | 2011 103941 | 9/2011 |
| WO | 2013 007426 | 1/2013 |
| WO | 2014 073566 | 10/2014 |
| WO | 2014 173567 | 10/2014 |
| WO | 2014 173569 | 10/2014 |
| WO | 2014 173574 | 10/2014 |

OTHER PUBLICATIONS

U.S. Appl. No. 14/782,545, filed Oct. 5, 2015, Lang et al.
U.S. Appl. No. 14/782,433, filed Oct. 5, 2015, Lang et al.
U.S. Appl. No. 14/782,099, filed Oct. 2, 2015, Lang et al.
International Search Report dated Jun. 6, 2014, in PCT/EP2014/054116 filed Mar. 4, 2014.
Combined Taiwanese Office Action and Search Report dated Jul. 4, 2016 in Patent Application No. 103114384 (with English language translation).
Korean Office Action dated Jan. 26, 2017 in patent application No. 10-2015-7030661 (with English summary).
Chinese Office Action dated Jan. 29, 2018 in corr. Chinese Patent Application No. 201480023110, filed Mar. 4, 2014, w/ English translation, citing reference AA therein.

* cited by examiner

METHOD AND DEVICE FOR PRODUCING POLYCHLOROSILANES

The invention relates to a process and an apparatus for preparation of polychlorosilanes from chlorosilanes, by subjecting monomeric chlorosilane to a thermal plasma.

The prior art discloses a number of processes for preparing polychlorosilanes. For instance, DE 10 2006 034 061 discloses a reaction of silicon tetrachloride with hydrogen to prepare polysilanes. Because of the reaction in the presence of hydrogen, the polysilanes prepared contain hydrogen. In order to be able to keep the plant in continuous operation, tetrachlorosilane is added in excess in relation to the hydrogen. In addition, the plant disclosed has a complex structure and allows only the preparation of polysilane mixtures. An elevated molecular weight of the polysilanes can be achieved only through series connection of a plurality of reactors and high-frequency generators. After passing through each of the series-connected plasma reactors, there is an increase in the molecular weight of the polysilanes after each plasma reactor. The process disclosed is restricted to the preparation of compounds which can be converted to the gas phase without decomposition.

EP 1 264 798 A1 discloses a process for workup of by-products comprising hexachlorodisilane in the preparation of polycrystalline silicon.

U.S. Pat. No. 4,542,002 and WO 2009/143823 A2 also disclose plasmatic processes for preparation of polychlorosilanes proceeding from silicon tetrachloride and hydrogen. As a result of the preparation, hydrogen-containing polychlorosilanes are obtained. According to WO 2009/143823 A2, mixtures of hydrogen-containing high molecular weight polychlorosilanes are obtained. The silicon tetrachloride present in the polychlorosilanes has to be removed by distillation under reduced pressure in a costly and inconvenient manner prior to further use. A particular disadvantage in the prior art is the need to prepare the polychlorosilanes in the presence of gaseous hydrogen. As a result, very high safety demands are placed on the materials and the safeguarding of the plant.

The problem addressed by the present invention is that of providing an economically viable process for preparing polychlorosilanes, especially polyperchlorosilanes, which features a high yield and a particularly high purity of the process products. A further problem addressed was that of being able to dispense with the use of hydrogen for preparation of polychlorosilanes.

Equally, it was also to be possible to prepare polychlorosilanes without the requirement that they have to be converted to the gas phase without decomposition in the course of preparation thereof. A further requirement was to prepare the polychlorosilanes directly, essentially free from monomeric chlorosilanes. An additional problem addressed was that of providing an inexpensive, simply constructed and easily operated plant for preparation of the polychlorosilanes. A particular focus lay on minimizing the inner surfaces, which can contribute to contamination of the polychlorosilanes. In addition, the plant was to require little vertical space. More particularly, high-purity, high molecular weight polychlorosilanes were also to be preparable, without any need for further purification prior to further processing, such as for deposition of silicon. A further problem addressed was that of providing a process for preparing high-purity, high molecular weight polychlorosilanes, and of providing the polychlorosilanes without any need to convert these polychlorosilanes to the gas phase, for example to distil them, for purification beforehand.

The stated problems are solved by a process according to claim 1, the polychlorosilanes obtainable thereby according to claim 15 and by the plant according to claim 12.

It has been found that, surprisingly, chlorosilanes, comprising monomeric chlorosilanes, optionally in a mixture with polychlorosilanes, can be converted in a good yield in a thermal plasma, i.e. a plasma at thermal equilibrium, to polychlorosilanes, in accordance with the invention to polyperchlorosilanes, especially to mixtures comprising hexachlorodisilane, octachlorotrisilane, decachlorotetrasilane, dodecachloropentasilane and/or mixtures comprising at least two of the compounds mentioned. Preference is given to polyperchlorosilane mixtures comprising polyperchlorosilanes having 2 to 8 silicon atoms. Particular preference is also given to the preparation of higher molecular weight polychlorosilanes having at least three silicon atoms, especially having 3 to 8 silicon atoms. It was particularly surprising in this context that the polychlorosilanes were preparable from monomeric chlorosilanes, preferably from tetrachlorosilane, and also from tetrachlorosilane, trichlorosilane and/or dichlorosilane, essentially without the presence of hydrogen gas in the thermal plasma. The particular economic advantage of the process according to the invention is achieved especially through the inventive apparatus comprising a gas discharge reactor arranged between two columns.

The inventive apparatus comprises a plasma reactor, i.e. a gas discharge reactor, with two dedicated reactive distillation columns. Preferably, one of the columns and the gas discharge reactor have a dedicated recycle line for repassage of unconverted monomeric chlorosilanes through the gas discharge reactor, which is shown in schematic form in FIG. 3. The polychlorosilanes, especially polyperchlorosilanes, prepared in accordance with the invention are preferably free of hydrogen.

In the context of the invention, a polychlorosilane is regarded as being free of hydrogen when its content of hydrogen atoms is below $1\times10^{-0}\%$ by weight, especially below $1\times10^{-4}\%$ by weight, further preferably below $1\times10^{-6}\%$ by weight down to the detection limit, which is currently $1\times10^{-10}\%$ by weight.

The invention likewise provides polychlorosilanes having a content of hydrogen atoms of below $1\times10^{-0}\%$ by weight, preferably below $1\times10^{-4}\%$ by weight down to the aforementioned detection limit. The preferred method for determining the content of hydrogen atoms is $^1$H NMR spectroscopy.

Polychlorosilanes according to the invention encompass the homologous series of the polyperchlorosilanes of the general formula II $$Si_nCl_{2n+2} \qquad \qquad II$$

where n is greater than or equal to 2, which forms linear and/or branched chains, and the polyperchlorosilanes which form rings or polymers, where the polymers may also be branched and/or cyclic, having the idealized formula III $$Si_nCl_{2n} \qquad \qquad III$$

where n is greater than or equal to 3, and also the silicon chlorides having a lower chlorine content of the idealized formula IV $$SiCl_{1.5}. \qquad \qquad IV$$

Particularly preferred polychlorosilanes are regarded as being compounds of the general formula II $Si_nCl_{2n+2}$ where n is greater than or equal to 2, especially where n is greater than or equal to 2 to 100, preferably where n is greater than or equal to 2 to 50, preferably in each case independently where n is greater than or equal to 2, 3, 4, 5, 6, 7, 8, 9 or 10, preferably 2 to 8, more preferably where n is equal to 2 or 3, where they may form linear or else branched chains; and compounds of the general formula III which form rings and polymers $Si_nCl_{2n}$ where n is greater than or equal to 3, especially where n is greater than or equal to 4 to 100, especially where n is greater than or equal to 4 to 50, more preferably in each case independently where n is greater than or equal to 4, 5, 6, 7, 8, 9 or 10, and also polychlorosilanes having a lower chlorine content according to the general formula IV $Si_nCl_{1.5n}$ where n is greater than or equal to 4 or 5, especially where n is greater than or equal to 6 to 200, preferably where n is greater than or equal to 8 to 100. A particularly great advantage of the process according to the invention is that these polychlorosilanes can be utilized as a single compound or in a mixture, without further purification, for deposition of high-purity silicon layers having solar silicon quality or even semiconductor quality. According to the invention, these polychlorosilanes are essentially free of hydrogen; more particularly, the content of hydrogen atoms therein is $1\times10^{-0}$% by weight, especially below $1\times10^{-4}$% by weight, further preferably below $1\times10^{-6}$% by weight down to the detection limit of $1\times10^{-10}$% by weight. The polychlorosilanes obtained in accordance with the invention are thus free of hydrogen atoms.

The invention thus provides a process for preparing polychlorosilanes, and polychlorosilanes obtainable by this process, especially polyperchlorosilanes, by subjecting chlorosilanes comprising at least one monomeric chlorosilane of the general formula I $$H_xSiCl_{4-x} \qquad \qquad I$$

where x is independently selected from 0, 1, 2 and 3, with x preferably being 0, 1 or 2, x further preferably being 0 or 1 and x more preferably being 0, or a mixture comprising at least two monomeric chlorosilanes of the formula I, especially selected from tetrachlorosilane, trichlorosilane and dichlorosilane, preferably pure tetrachlorosilane or pure tetrachlorosilane having a total content of trichlorosilane and/or dichlorosilane of less than or equal to 20% by weight in the mixture, and optionally chlorosilanes in a mixture with a low content of hexachlorodisilane, to a thermal plasma and converting them to polychlorosilanes.

The particular advantage of the process is that there is no need to use any hydrogen carrier gas or any additional catalyst. It is thus possible in the process to convert monomeric chlorosilanes of the general formula I or mixtures of monomeric chlorosilanes of the formula I in the thermal plasma to polychlorosilanes, with essentially no need to add any additional hydrogen-containing compounds, especially hydrogen. Chlorosilanes are considered to be monomeric chlorosilanes and possibly polychlorosilanes, such as preferably hexachlorodisilane.

The polychlorosilanes are prepared solely by conversion of monomeric chlorosilanes of the general formula I in the presence of a thermal plasma, especially in the thermal plasma.

Preferably, a defined return ratio of monomeric chlorosilanes of the general formula I, which are regarded as low boilers, is set at a condenser in the inventive apparatus. It may additionally be advantageous to remove only monochlorosilane, HCl and/or monosilane which forms from the system at the top of the low boiler column in the apparatus.

All further monomeric chlorosilanes are condensed and recycled into the system. This separation is easily possible with the aid of appropriate temperature control in the condenser. In a particularly preferred process regime, in the case of tetrachlorosilane as a reactant with a certain trichlorosilane and/or dichlorosilane content, the hexachlorodisilane formed is condensed in the condenser and discharged, while the further chlorosilanes are fed back to the gas discharge reactor in gaseous form.

The possible reactions in the thermal plasma can be represented in idealized form as follows:

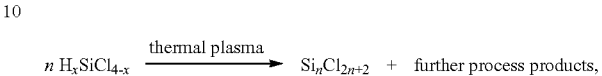

$n\ H_xSiCl_{4-x} \xrightarrow{\text{thermal plasma}} Si_nCl_{2n+2}$ + further process products, for example HCl and $H_2$, where x=0, 1, 2 or 3, preferably where x is equal to 1 or 0, and preferably where n is independently 2 or 3.

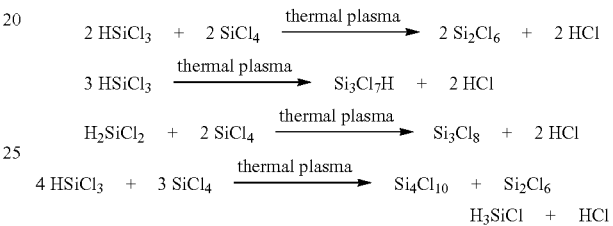

$2\ HSiCl_3 + 2\ SiCl_4 \xrightarrow{\text{thermal plasma}} 2\ Si_2Cl_6 + 2\ HCl$ $3\ HSiCl_3 \xrightarrow{\text{thermal plasma}} Si_3Cl_7H + 2\ HCl$ $H_2SiCl_2 + 2\ SiCl_4 \xrightarrow{\text{thermal plasma}} Si_3Cl_8 + 2\ HCl$ $4\ HSiCl_3 + 3\ SiCl_4 \xrightarrow{\text{thermal plasma}} Si_4Cl_{10} + Si_2Cl_6$
$\qquad \qquad \qquad \qquad \qquad \qquad \qquad \qquad H_3SiCl + HCl$ Preferably, the chlorosilanes of the general formula I used are tetrachlorosilane, trichlorosilane, dichlorosilane or mixtures of these. A particular advantage of the process is the possibility of preparing polychlorosilanes with semiconductor quality, proceeding from ultrahigh-purity tetrachlorosilane ($STC_{eg}$).

In the context of the invention, the term "electronics grade", "eg" for short, is used for "ultrahigh-purity".

Alternatively, polychlorosilane can be prepared proceeding from ultrahigh-purity trichlorosilane ($TCS_{eg}$), or from ultrahigh-purity dichlorosilane ($DCS_{eg}$), and from mixtures of the chlorosilanes mentioned. A preferred mixture of correspondingly ultrahigh purity comprises tetrachlorosilane having a trichlorosilane and/or dichlorosilane content.

For preparation of the inventive polychlorosilanes, a high- to ultrahigh-purity monomeric chlorosilane of the general formula I or a mixture of the monomeric chlorosilanes of the formula I is used, such as ultrahigh-purity tetrachlorosilane, ultrahigh-purity trichlorosilane and/or ultrahigh-purity dichlorosilane, preferably having a content of chlorosilanes of 80 to 99.9999999% by weight, with polychlorosilanes up to 100% by weight. In the high-purity chlorosilane the total contamination is in the range from 100 ppm by weight to 0.001 ppt by weight, and in ultrahigh-purity chlorosilane from 50 ppm by weight to 0.001 ppt by weight, preferably from 40 ppm by weight to 0.001 ppt by weight.

This total contamination comprises the elements a to i specified below.

Preferably, the content of monomeric chlorosilanes is 98% by weight to 99.9999999% by weight with less than or equal to 100 ppm by weight to 0.001 ppt by weight of total contaminants in a high-purity chlorosilane, preferably less than 50 ppm by weight to 0.001 ppt by weight in an ultrahigh-purity chlorosilane, and optionally polychlorosilanes up to 100% by weight, where the total impurities of the monomeric chlorosilanes of the general formula I have elements as follows:

a. aluminium from 15 ppm by weight to 0.0001 ppt by weight, and/or
b. boron from 5 to 0.0001 ppt by weight,
   preferably in the range from 3 ppm by weight to 0.0001 ppt by weight, and/or
c. calcium less than 2 ppm by weight,
   preferably from 2 ppm by weight to 0.0001 ppt by weight, and/or
d. iron from 5 ppm by weight to 0.0001 ppt by weight,
   preferably from 0.6 ppm by weight to 0.0001 ppt by weight, and/or
e. nickel from 5 ppm by weight to 0.0001 ppt by weight,
   preferably from 0.5 ppm by weight to 0.0001 ppt by weight, and/or
f. phosphorus from 5 ppm by weight to 0.0001 ppt by weight,
   preferably from 3 ppm by weight to 0.0001 ppt by weight, and/or
h. titanium less than or equal to 10 ppm by weight,
   preferably less than or equal to 2 ppm by weight,
   further preferably from 1 ppm by weight to 0.0001 ppt by weight,
   more preferably from 0.6 ppm by weight to 0.0001 ppt by weight,
   most preferably from 0.1 ppm by weight to 0.0001 ppt by weight, and/or
h. zinc less than or equal to 3 ppm by weight,
   preferably from 1 ppm by weight to 0.0001 ppt by weight,
   further preferably from 0.3 ppm by weight to 0.0001 ppt by weight, and/or
i. carbon,
   where the target for carbon is a concentration in the region of the detection limit which is dependent on the measurement method and is known to those skilled in the art.
   The total contamination with the aforementioned elements is preferably determined by means of ICP-MS.

A particular advantage of the process according to the invention is that the preparation of the polysilanes can be controlled selectively. The polychlorosilanes obtained by the process are preferably polyperchlorosilanes having 2 to 8 silicon atoms, preference being given to polychlorosilanes having 2, 3, 4, 5, 6 and/or 7 silicon atoms, preferably of the formulae II, II and/or IV, which are free of hydrogen in the context of the detection limits known in mass spectroscopy.

Particularly preferred polychlorosilanes include hexachlorodisilane, octachlorotrisilane, n-decachlorotetrasilane, iso-decachlorotetrasilane, tent-decachlorotetrasilane, dodecachloropentasilane as n-dodecachloropentasilane, 2-trichlorosilyldecachlorotetrasilane, 1,1-di(trichlorosilyl)octachlorotrisilane, 2,2-di(trichlorosilyl)octachlorotrisilane and/or 1,2-di(trichlorosilyl)octachlorotrisilane as a single compound or as a mixture comprising at least two of the polychlorosilanes mentioned.

A further advantage of the process is the preparation of ultrahigh-purity polychlorosilanes, such as ultrahigh-purity octachlorotrisilane or ultrahigh-purity hexachlorodisilane, and of ultrahigh-purity decachlorotetrasilanes and/or dodecachloropentasilanes mentioned above, which meet the demands of the semiconductor industry.

Thus, in a particularly preferred process variant, the polychlorosilane isolated is ultrahigh-purity octachlorotrisilane having an octachlorotrisilane content of 95.9999% by weight to 99.999999% by weight, the remaining content up to 99.999999% by weight in each case comprising hexachlorodisilane, decachlorotetrasilane and/or dodecachloropentasilane. In one alternative, the polychlorosilane isolated is ultrahigh-purity hexachlorodisilane having a hexachlorodisilane content of 95.9999% by weight to 99.999999% by weight, the remaining content up to 99.999999% by weight in each case comprising octachlorotrisilane, decachlorotetrasilane and/or dodecachloropentasilane. The hydrogen content in the aforementioned polychlorosilanes is preferably below the detection limit. Suitable analyses are methods known to those skilled in the art, such as CHN analysis, $^1$H NMR, preferably in combination with ICP-MS.

In a particularly preferred process variant, the polychlorosilanes isolated are ultrahigh-purity polychlorosilanes in the form of ultrahigh-purity hexachlorodisilane, ultrahigh-purity octachlorotrisilane, ultrahigh-purity decachlorotetrasilane or ultrahigh-purity dodecachloropentasilane or a mixture of polychlorosilanes, each having a titanium content below 10 ppm by weight, preferably below 8 ppm by weight, more preferably below 5 ppm by weight, further preferably less than 1 ppm by weight (measured by means of ICP-MS).

Ultrahigh-purity polychlorosilanes, preferably ultrahigh-purity polyperchlorosilanes, especially ultrahigh-purity hexachlorodisilane, ultrahigh-purity octachlorotrisilane, ultrahigh-purity decachlorotetrasilane or ultrahigh-purity dodecachloropentasilane, preferably ultrahigh-purity mixtures of the aforementioned polychlorosilanes, are considered to be polychlorosilanes having a polychlorosilane content, preferably a polyperchlorosilane content, of 99.99 to 99.9999999% by weight, preferably of 99.9999 to 99.9999999% by weight, the total contamination being below 100 ppm by weight, especially with contaminants of one, more than one or all of the elements selected from boron, phosphorus, carbon and extraneous metals, and also hydrogen, preferably selected from boron, phosphorus, carbon, aluminium, calcium, iron, nickel, titanium and zinc and/or hydrogen.

Further preferably, in the process according to the invention, the polychlorosilane obtained is a polyperchlorosilane, preferably a high-purity polyperchlorosilane having a total contamination less than or equal to 100 ppm by weight down to the detection limit or to 0.001 ppt by weight as per the above definition. Further preferably, an ultrahigh-purity polychlorosilane having from 50 ppm by weight to 0.001 ppt by weight of total impurities is obtained.

More preferably, a polychlorosilane, PCS for short, is obtained, especially hexachlorodisilane, octachlorotrisilane or a mixture comprising hexachlorodisilane, octachlorotrisilane, decachlorotetrasilane and/or dodecachloropentasilane, preferably high- to ultrahigh-purity polychlorosilanes having 2 to 8, preferably having 2 to 7 silicon atoms, further preferably having 3 to 8 silicon atoms, preferably polyperchlorosilanes, where the polychlorosilane especially has an octachlorotrisilane content of 20 to 99.9999% by weight, preferably in a mixture with other polychlorosilanes, more preferably with an octachlorotrisilane content of 91 to 99.9999999% by weight, even more preferably with a content of 99.99 to 99.9999999% by weight.

It is likewise possible to obtain a high- to ultrahigh-purity hexachlorodisilane, which may be present in a mixture with other polychlorosilanes, preferably polyperchlorosilanes. Particular preference is given to a hexachlorodisilane having a content of 20 to 99.9999% by weight, preferably having a content of 91 to 99.9999999% by weight, further preferably having a content of 99.99 to 99.9999999% by weight, where the aforementioned polysilanes each independently have the contamination profile which follows for one, more than one or all of the elements which follow.

High-purity polychlorosilanes in the context of the invention refer to polychlorosilanes having contaminants in the following concentrations:
a. aluminium less than 5 ppm by weight,
   preferably from 5 ppm by weight to 0.0001 ppt by weight,
   further preferably from 3 ppm by weight to 0.0001 ppt by weight, and/or
b. boron from 10 ppm by weight to 0.0001 ppt by weight,
   preferably in the range from 5 to 0.0001 ppt by weight,
   further preferably in the range from 3 ppm by weight to 0.0001 ppt by weight, and/or
c. calcium less than 2 ppm by weight,
   preferably from 2 ppm by weight to 0.0001 ppt by weight, and/or
d. iron less than or equal to 20 ppm by weight,
   preferably from 10 ppm by weight to 0.0001 ppt by weight,
   further preferably from 0.6 ppm by weight to 0.0001 ppt by weight, and/or
e. nickel less than or equal to 10 ppm by weight,
   preferably from 5 ppm by weight to 0.0001 ppt by weight,
   more preferably from 0.5 ppm by weight to 0.0001 ppt by weight, and/or
f. phosphorus from 10 ppm by weight to 0.0001 ppt by weight,
   preferably from 5 ppm by weight to 0.0001 ppt by weight,
   further preferably from 3 ppm by weight to 0.0001 ppt by weight, and/or
g. titanium less than or equal to 10 ppm by weight,
   preferably less than or equal to 2 ppm by weight,
   more preferably from 1 ppm by weight to 0.0001 ppt by weight,
   further preferably from 0.6 ppm by weight to 0.0001 ppt by weight,
   especially preferably from 0.1 ppm by weight to 0.0001 ppt by weight, and/or
h. zinc less than or equal to 3 ppm by weight,
   preferably from 1 ppm by weight to 0.0001 ppt by weight,
   further preferably from 0.3 ppm by weight to 0.0001 ppt by weight, and/or
i. carbon and/or
j. hydrogen,
where the target for each of carbon and hydrogen is a concentration in the region of the detection limit which is dependent on the measurement method and is known to those skilled in the art.

As stated, the total contamination of the polychlorosilane with the aforementioned elements or contaminants is from 100 ppm by weight to 0.001 ppt by weight in high-purity polychlorosilane, preferably from 50 ppm by weight to 0.001 ppt by weight in ultrahigh-purity polychlorosilane, further preferably from 10 ppm by weight to 0.001 ppt by weight, more preferably from 5 ppm by weight to 0.001 ppt by weight in total. The operation can be monitored continuously by means of online analysis, which is known to those skilled in the art. The required purity can be checked by means of GC, IR, NMR, ICP-MS, or by resistance measurement or GD-MS after deposition of the Si.

A further advantage of the process is that it is possible to dispense with the addition of costly noble or inert gases. Alternatively, it is possible to add an entraining gas, preferably a pressurized inert gas, such as nitrogen, argon, another noble gas or mixtures thereof.

In a further-preferred process variant, the process according to the invention is used to prepare polychlorosilanes, especially polychlorosilane mixtures comprising hexachlorodisilane, octachlorotrisilane, decachlorotetrasilane and/or dodecachloropentasilane, optionally in a mixture with higher molecular weight polychlorosilanes having six to seven silicon atoms, by subjecting monomeric chlorosilane of the general formula I, especially tetrachlorosilane, trichlorosilane, dichlorosilane or a mixture of monomeric chlorosilanes of the formula I comprising two of the compounds mentioned or all three compounds, to a thermal plasma in an apparatus comprising a gas discharge reactor having two columns.

It is further preferable when chlorosilane of the formula I is supplied to a column for removal of the polychlorosilanes arranged upstream of the gas discharge reactor, or is introduced directly into the gas discharge reactor. The polychlorosilanes removed are regarded as high boilers. The ratio of higher molecular weight polychlorosilanes having six to eight silicon atoms to low molecular weight polychlorosilanes having two to five silicon atoms can be controlled in a simple manner via the flow rate in the process according to the invention through the contact times in the gas discharge reactor.

In a particularly preferred embodiment, the process is performed in an apparatus having a first column having a column inlet for removal of the polychlorosilanes upstream of, especially below, the gas discharge reactor, and a second column having a column inlet for removal of the low boilers, especially of the monomeric chlorosilanes, and any entrained high boilers, such as polychlorosilanes, downstream of and beyond, especially above, the gas discharge reactor. Preferably, the column outlet of the second column has a dedicated condenser for condensation of the low boilers. The apparatus may also be referred to as a plasma reactive distillation apparatus, in which case the plasma reactor is arranged between two reactive distillation columns.

Preferably, any polychlorosilanes discharged, such as hexachlorodisilane, are condensed in the aforementioned condenser. Moreover, the condenser has a dedicated recycle line, which feeds the low boilers and any additionally condensed polychlorosilanes back to the first column, especially in the upper half, preferably in the upper third, or to the gas discharge reactor. The polychlorosilanes can run off into the bottom draw in the first column, or optionally can be condensed partly or fully, according to the polychlorosilane product desired, and sent to a receiver vessel attached to the bottom draw or to a reboiler. The temperature of the reboiler is adjusted such that the desired polychlorosilane is not converted to the gas phase. The reboiler used may preferably be a circulation evaporator for gentle heating of the polysilanes. Alternatively, it is also possible to continuously discharge bottom product, in order to minimize thermal stress.

The polychlorosilane obtained can be purified further if required, for example distilled or purified by means of chromatography. However, further purification is generally unnecessary for polychlorosilanes prepared in accordance with the invention. If required, the polychlorosilane obtained can be sent to a vacuum distillation, especially in order to adjust the content of a specific polychlorosilane if mixtures of polychlorosilanes have been obtained. Thus, it is possible with preference to distil a polychlorosilane comprising octachlorotrisilane or decachlorotetrasilane under reduced pressure, in order to increase the content of the desired polychlorosilane. Alternatively or additionally, a chromatographic workup may also follow, in order to remove impurities or else to adjust the octachlorotrisilane content or, for example, the decachlorotetrasilane content in the polychlorosilane.

If the polychlorosilanes desired are polyperchlorosilanes having 3 to 7 silicon atoms, the condensed low boilers, comprising monomeric chlorosilanes and especially hexachlorodisilane, are conducted as low boilers through the second column and condensed in the condenser as low boilers and recycled through the recycle line into the first column or into the gas discharge reactor. In the first column, the temperature control system is set to a value which allows the removal of essentially high-purity polychlorosilanes, especially having at least 2 silicon atoms, in the column outlet of the first column.

The polychlorosilanes include especially polyperchlorosilane mixtures comprising polyperchlorosilanes having 2 to 8 silicon atoms, preferably octachlorotrisilane, decachlorotetrasilane and/or dodecachloropentasilane, or else polyperchlorosilanes having 6 and 7 silicon atoms, which can run off into the bottoms at the column outlet of the first column. In this way, the desired polychlorosilanes can run off through the first column and be removed, without first being converted to the gas phase.

In a further process variant, (i) the chlorosilanes of the formula I leaving the gas discharge reactor via the second column in a mixture with hexachlorodisilane can be separated from hexachlorodisilane in the apparatus (0) using the condenser (5). For example, only hexachlorodisilane is condensed and discharged; the monomeric chlorosilanes remain in the gas phase and are recycled, (ii) the chlorosilanes of the formula I are recycled via the recycle line into the first column, and (iii) again conducted through the gas discharge reactor, and (iv) polychlorosilanes, especially ultrahigh-purity polyperchlorosilanes comprising octachlorotrisilane, decachlorotetrasilane and/or dodecachloropentasilane, are obtained at the column outlet of the first column, especially as a polyperchlorosilane mixture comprising polyperchlorosilanes having 2 to 8 silicon atoms, especially having 3 to 8 silicon atoms.

In a further process variant, (i) the chlorosilanes of the formula I leaving the gas discharge reactor in a mixture with hexachlorodisilane via the second column can be separated from hexachlorodisilane in the apparatus (0) using the condenser (5), for example only hexachlorodisilane is condensed and discharged; the monomeric chlorosilanes remain in the gas phase and are recycled, (ii) the chlorosilanes of the formula I are conducted again via the recycle line through the gas discharge reactor and (iii) polychlorosilanes are obtained at the column outlet of the first column.

Additionally or alternatively to one of the aforementioned features, preferably polychlorosilane mixtures having at least 1 mol % of branched polychlorosilanes in the overall composition are obtained, the proportion preferably being greater than or equal to 1.5 mol %. Preference is further given to a process in which chlorosilane of the general formula I or a mixture of chlorosilanes of the formula I and possibly chlorosilane in a mixture with hexachlorodisilane is introduced into the gas discharge reactor or supplied to the first column, the chlorosilane or a mixture preferably being supplied in gaseous form to the gas discharge reactor or the first column. It is further preferable when the chlorosilane is evaporated when supplied for the first time; when returned as low boilers, the chlorosilane is evaporated in the first column, while octachlorotrisilane formed and/or, if desired, hexachlorodisilane are not evaporated and can run off into the receiver vessel at the bottom and be collected. The monomeric chlorosilanes are regarded as low boilers, while the polychlorosilanes are regarded as high boilers, with an exception in the case of preparation of polychlorosilanes having 3 to 8 silicon atoms. In this special case, hexachlorodisilane is likewise regarded as a low boiler to be condensed in the condenser. In all other preparation variants, hexachlorodisilane is regarded as a high boiler and should run off into the receiver in the first column. In the process according to the invention, any hydrogen and/or hydrogen chloride formed are discharged from the process as process gases and can subsequently be separated, condensed outside this apparatus or fed to another process.

It is likewise preferable when, in the process according to the invention, (i) the chlorosilane of the formula I leaving the gas discharge reactor via the second column, especially tetrachlorosilane, trichlorosilane and/or dichlorosilane and/or mixtures of these, and polychlorosilanes, especially comprising hexachlorodisilane and optionally also octachlorotrisilane, are condensed in the apparatus using the condenser and (ii) recycled into the first column using the recycle line and (iii) this chlorosilane, optionally in a mixture with hexachlorodisilane and/or octachlorotrisilane, is conducted back through the gas discharge reactor, while (iv) polychlorosilanes having preferably 4 to 8 silicon atoms are obtained at the column outlet of the first column; more particularly, the polychlorosilanes (v) are obtained in a receiver vessel dedicated to the column outlet or a reboiler dedicated to the column outlet. The polychlorosilane thus obtained is of high to ultrahigh purity as per the above definition.

With regard to the formation of higher molecular weight polychlorosilanes, the process is unlimited, and so it is possible, through the recycling of condensed polychlorosilanes, also to obtain high molecular weight polychlorosilanes which are liquid under the process conditions selected and have 3, 4, 5, 6, 7, 8, 9 and/or 10 silicon atoms, and which may be linear, branched and/or cyclic. The molecular weight of the polychlorosilanes is adjusted in a simple and economically viable manner via the adjustment of the return flow, i.e. only monomeric chlorosilanes or additionally di- and/or trisilanes are fed back to the gas discharge reactor.

The polychlorosilane thus obtained is of high to ultrahigh purity as per the above definition. In an alternative process regime, hexachlorodisilane is obtained in step (iv).

The chlorosilanes of the formula I, especially tetrachlorosilane, trichlorosilane and/or dichlorosilane, leaving the gas discharge reactor, especially the plasmatron, via the second column correspond to chlorosilanes unconverted in the process, which are fed back to the gas discharge reactor for conversion. The particular advantage of the process and the economic viability thereof arise from the recycling or circulation of the chlorosilanes unconverted in the gas discharge reactor.

Hydrogen, chlorine, hydrogen chloride, monosilane and monochlorosilane are not condensed in the condenser and are discharged from the process. The inventive recycling of unconverted chlorosilane reactants and the simultaneous discharge of the polychlorosilanes in the first column as bottom products can, with an apparatus or plant of simple construction, provide a particularly economically viable process with extremely reduced internal surface areas of the plant parts. Known processes and plants make a considerable contribution to the contamination of the products and the costs of the plant parts. Both the costs and the contamination were distinctly reduced by the process according to the invention and the apparatus according to the invention.

A further advantage of the process is that, in the case of recycling of unconverted chlorosilanes, the molar ratios of these chlorosilanes can be measured online, especially by means of IR, GC, and the molar addition of further chlorosilanes as reactants can be controlled, in order to be able to establish a defined molar ratio between the chlorosilanes of the general formula I in the gas discharge reactor.

In an alternative process regime, the low boilers can be fed to the evaporator of the reactant feed or to the evaporator in the gas discharge reactor, such that the chlorosilanes and any hexachlorodisilane are evaporated and the unevaporated octachlorotrisilane can run off in the first column.

Additionally or alternatively to one of the aforementioned process features, it is preferable when defined molar mixtures of monomeric chlorosilanes of the general formula I are used in the process or defined molar ratios are established in the thermal plasma. Preferred molar ratios of tetrachlorosilane and trichlorosilane are preferably equal to or between 1:10 and 10:1, especially 1:5 and 5:1, preferably 1:2 and 2:1, preference being given to an approximately equimolar ratio for preparation of hexachlorodisilane.

For preparation of octachlorotrisilane, preference is given to using a) a mixture of chlorosilanes of the general formula I, comprising tetrachlorosilane and dichlorosilane, especially in a molar ratio equal to or between 1:10 and 10:1, especially 1:5 and 5:1, preferably 1:2 and 2:1, preference being given to an approximately equimolar ratio for preparation of hexachlorodisilane; or preference is given to using b) trichlorosilane as the chlorosilane.

The high purity demands on the polychlorosilane prepared can be achieved because of the high- to ultrahigh-purity chlorosilanes used, since the process according to the invention additionally dispenses with the use of further chemical compounds, such as catalysts or carrier gases etc. The specific construction of the apparatus for preparing the polychlorosilanes from monomeric chlorosilanes allows a considerable reduction in the number of plant parts and in the surface areas thereof which come into contact with the high-purity to ultrahigh-purity chlorosilanes and polychlorosilanes. Thus, the inventive construction of the plant in combination with the process according to the invention allows a particularly economically viable process regime with distinctly reduced contamination influences.

Therefore, in the process according to the invention, and especially using the inventive apparatus, a high-purity octachlorotrisilane, especially an ultrahigh-purity octachlorotrisilane, a high-purity hexachlorodisilane, especially an ultrahigh-purity hexachlorodisilane, or a mixture of the two polychlorosilanes with less than or equal to 1 ppm by weight of titanium in each case can be obtained.

In the process according to the invention, a thermal plasma can be generated at electrical equilibrium. Thermal plasmas are regarded as being plasmas which are operated under elevated pressure and lead to an equilibrium state. In a thermal plasma, the electrons $T_E$ and the ions $T_I$ have a relatively high temperature, since the free path length of the particles is low and the impact frequency is high, such that a homogeneous gas temperature $T_G$ is established, with $T_E$ approximately equal to $T_I$ and $T_I$ approximately equal to $T_G$. A thermal plasma thus has a high energy density and a high operating temperature. The plasma is a light arc plasma and, according to the voltage applied, has currents between a few milliampere up to a few kiloampere. Preferably, the process is conducted within the automatic discharge range, working within the glow discharge range (70 to 1000 V, 1 to 1000 mA), more preferably within the arc discharge range (10 to 50 V, greater than 1 A). The light arc plasma or the thermal plasma is generated with the aid of a plasmatron. Generally speaking, direct and indirect DC or AC plasmatrons are suitable for performance of the process according to the invention. In order to produce a preferred homogeneous thermal plasma, an indirect DC plasmatron is utilized.

In an indirect plasmatron, the monomeric chlorosilane of the general formula I flows around and through the light arc between cathode and anode within the plasmatron, and is optionally dissociated and ionized. In order to generate a non-extinguishing light arc, preference is given to working with a DC plasmatron.

For performance of the process according to the invention, the pressure in the gas discharge reactor is from 3 to 30 000 $mbar_{abs.}$, preferably from 100 to 1200 $mbar_{abs}$.

The invention likewise provides polychlorosilanes obtainable by the process described above, especially according to any of Claims one to twelve, wherein the polychlorosilanes are a mixture comprising hexachlorodisilane, octachlorotrisilane, n-decachlorotetrasilane, tert-decachlorotetrasilane and/or dodecachloropentasilane and structural isomers thereof, and have a titanium content of less than or equal to 10 ppm by weight, preferably less than 8 ppm by weight, more preferably less than 6 ppm by weight, especially preferably less than 4 ppm by weight. Especially preferably, the titanium content is less than 2 ppm by weight, and with a proportion of branched polychlorosilanes greater than or equal to 1 mol %, especially greater than 1.5 mol %.

Figure 3:
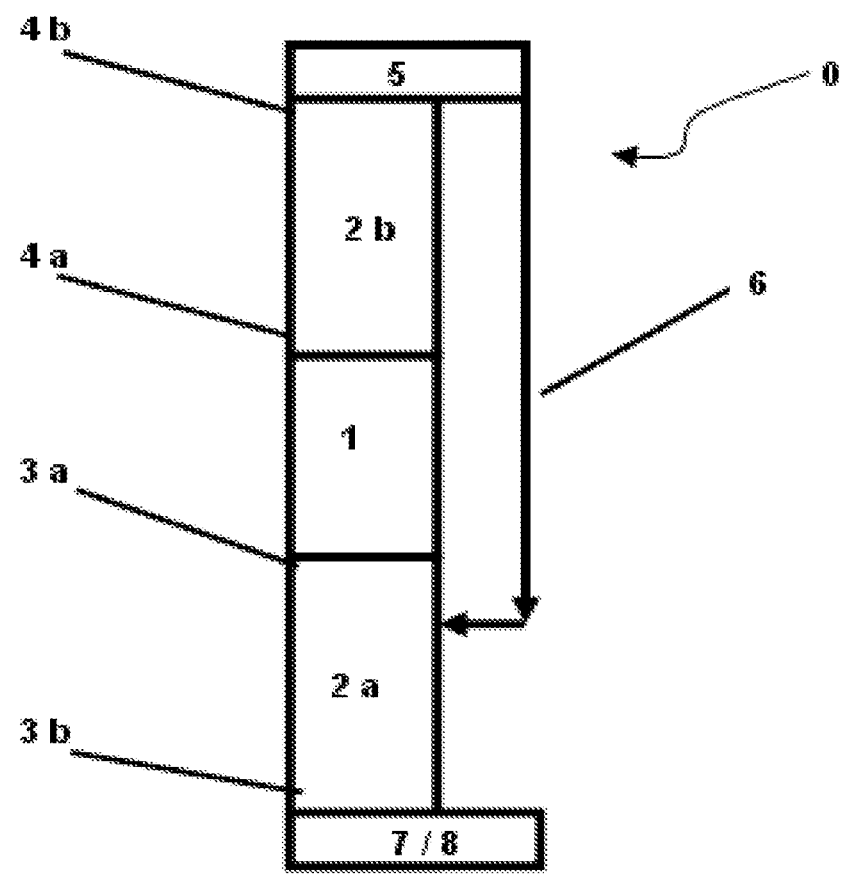
Figure 4:
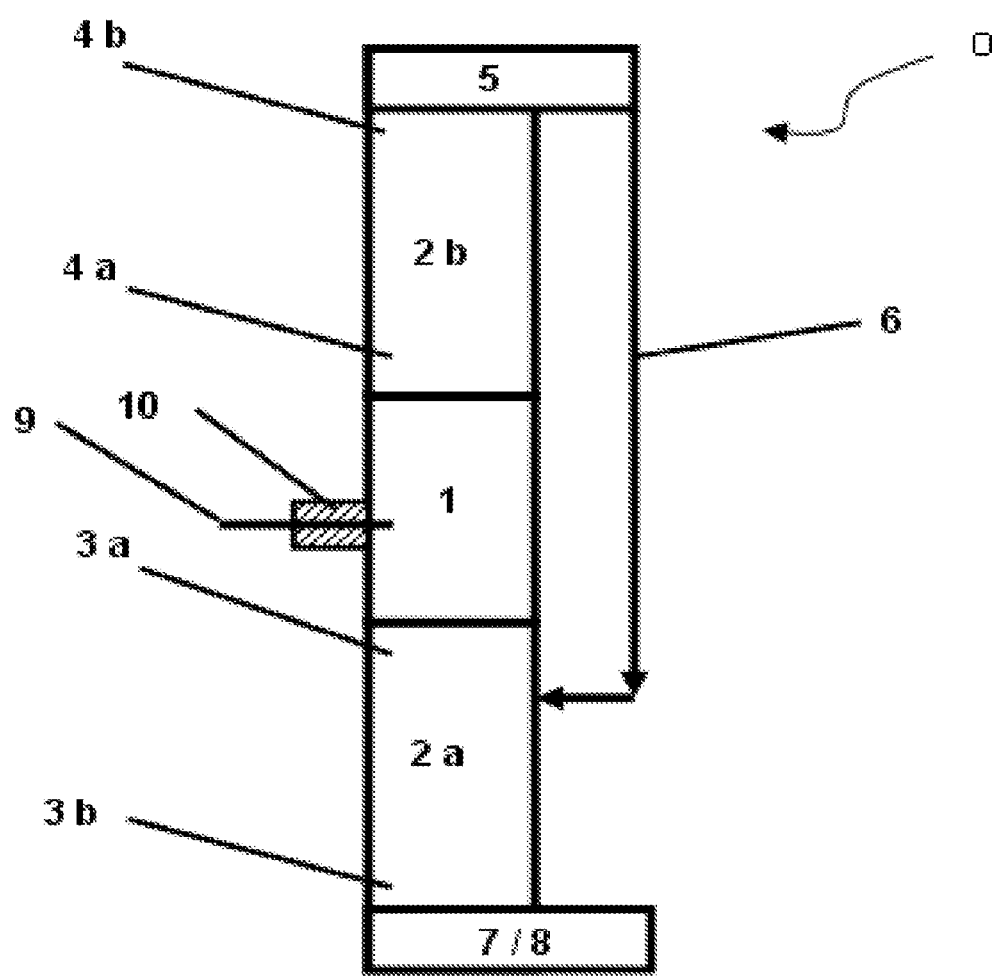

The invention likewise provides an apparatus or a plant as shown in schematic form in FIGS. 3 and 4. The apparatus is particularly suitable for performance of the process according to the invention. The apparatus 0 has a gas discharge reactor 1 with two dedicated columns 2a, 2b. The gas discharge reactor is preferably a plasmatron (direct or alternating current), more preferably an indirect plasmatron. Further preferably, the apparatus has, in addition to the gas discharge reactor, a first column 2a with a column inlet 3a for removal of the polychlorosilanes upstream of the gas discharge reactor 1 and a second column 2b with a column inlet 4a for removal of the low boilers and any circulating hexachlorodisilane downstream of the gas discharge reactor 1. This apparatus is arranged essentially vertically, as shown in FIGS. 3 and 4. In addition, it is preferable when the column outlet 4b of the column 2b has a dedicated condenser 5 for condensation of the low boilers. For supply of the chlorosilanes to the gas discharge reactor, the reactor has a dedicated reactant feed 9 (FIG. 4), which, in one alternative, has an evaporator 10 (FIG. 4) for evaporation and/or temperature control of the reactants. Alternatively, the evaporator may also be within the gas discharge reactor.

In a particularly preferred embodiment, the condenser 5 has a dedicated recycle line 6 which feeds the low boilers to the first column 2a, or alternatively optionally to the gas discharge reactor, to an evaporator in the gas discharge reactor or to an evaporator dedicated to the reactant feed. The lower column outlet of the first column has a dedicated receiver vessel 7 at the bottom draw or reboiler 8. According to the invention, what are called packed columns or reactive columns, which may have, for example, Raschig rings or bubble-cap trays, are used as the first and/or second columns. The polychlorosilanes prepared are isolated in high purity or ultrahigh purity in a receiver vessel 7 dedicated to the column outlet 3b of the first column or a reboiler 8 dedicated to the column outlet 3b.

The invention likewise provides polychlorosilanes selected from octachlorotrisilane, hexachlorodisilane and a mixture of octachlorotrisilane and hexachlorodisilane having a titanium content of less than or equal to 1 ppm by weight,
and for the use thereof for deposition of silicon.

The polychlorosilanes prepared by the process and the inventive polychlorosilanes are outstandingly suitable for deposition of layers comprising high- to ultrahigh-purity silicon. The use of the polysilanes prepared in accordance with the invention allows the chlorine load in the course of deposition, and also the deposition temperature, to be distinctly reduced. The high-purity or ultrahigh-purity dimeric, trimeric, tetrameric and/or pentameric polychlorosilanes prepared by the process according to the invention, and mixtures thereof, are highly suitable for use in the preparation of silicon nitride, silicon oxynitride, silicon carbide, silicon oxycarbide or silicon oxide, especially for production of layers of these materials and for production of epitaxial layers, preferably by low-temperature epitaxy. These layers can be produced, for example, by chemical vapour deposition (CVD). In addition, the high-purity or ultrahigh-purity polychlorosilanes prepared are suitable as a starting substance for the preparation of high-purity disilane ($Si_2H_6$) or trisilane ($Si_3H_8$).

The invention is illustrated in detail hereinafter by the figures.

FIG. 1: Mixture comprising octachlorotrisilane and hexachlorodisilane prepared by the process according to the invention, 99.34 MHz $^{29}$Si NMR in DMSO.

Figure 2:
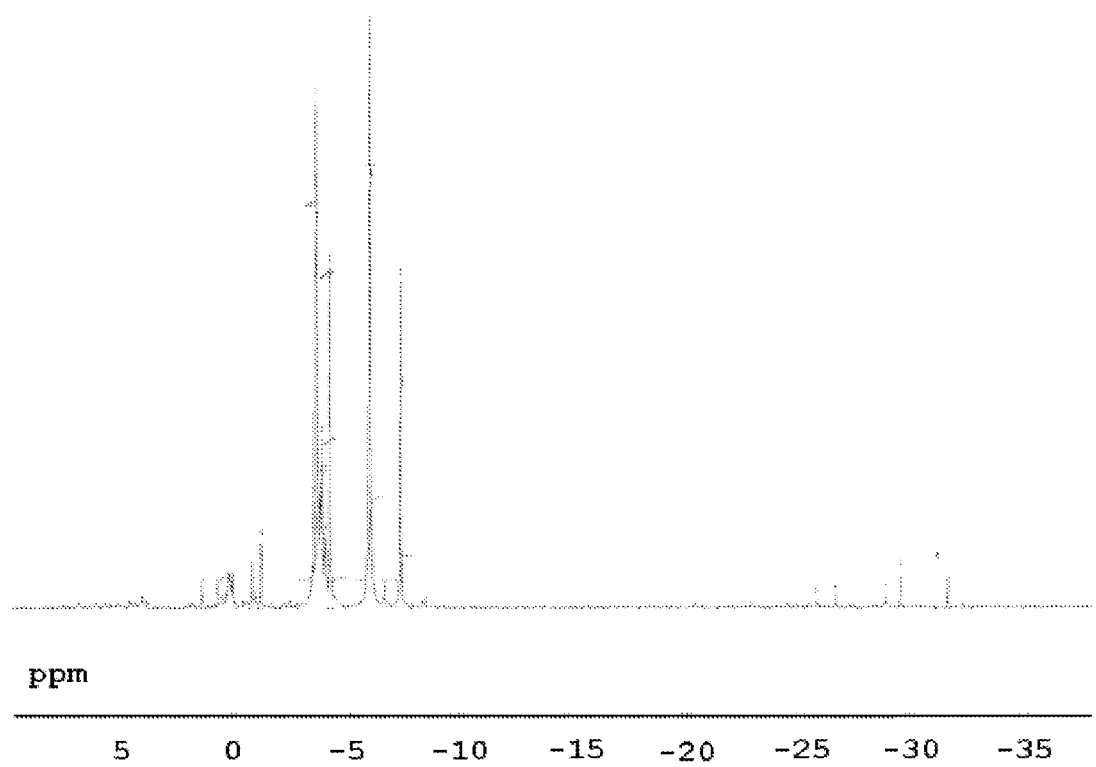

FIG. 2: Polychlorosilanes comprising hexachlorodisilane, octachlorotrisilane, tert-decachlorotetrasilane, n-decachlorotetrasilane and dodecachloropentasilane prepared by the process according to the invention, 99.34 MHz $^{29}$Si NMR in DMSO. A=$Si_2Cl_6$, B=n-$Si_3Cl_8$, C=$(Cl_3Si)_3SiCl$, D=n-$Si_4Cl_{10}$ and E=n-$Si_5Cl_{12}$, where component A corresponds to a molar proportion of 51.1%, B to a molar proportion of 30.0%, C to a molar proportion of 1.4%, D to a molar proportion of 13.7%, E to a molar proportion of 3.7%. The calculation is effected by normalizing the individual area peaks to 100%.

FIG. 3: Schematic diagram of apparatus 0 comprising a gas discharge reactor 1 and a first column 2a and a second column 2b, and also a condenser 5 and a recycle line 6.

FIG. 4: Schematic diagram of the apparatus 0 with reboiler 8 and reactant feed 9, and also evaporator 10.

LIST OF REFERENCE NUMERALS 0 apparatus/plant
1 gas discharge reactor
2a first column
2b second column
3a upper column outlet of the first column
3b lower column outlet of the first column
4a lower column outlet of the second column
4b upper column outlet of the second column
5 condenser
6 recycle line
7 receiver vessel
8 reboiler
9 reactant feed
10 evaporator

The invention claimed is:

1. A process for preparing polychlorosilanes, comprising:
subjecting chlorosilanes to a thermal plasma and converting the chlorosilanes to the polychlorosilanes;
wherein the chlorosilanes comprise at least one monomeric chlorosilane of the formula I:

$$H_xSiCl_{4-x} \quad (I),$$

where x is independently selected from 0, 1, 2 and 3,
wherein the process is performed in an apparatus comprising a gas discharge reactor having two columns,
wherein
a first column has a first column inlet for removing the polychlorosilanes upstream of the gas discharge reactor, and
a second column has a second column inlet for removing low boilers downstream
of the gas discharge reactor, and
wherein
a second column outlet of the second column has a condenser for condensation of the low boilers, and
the condenser has a recycle line that feeds the low boilers to the first column or the gas discharge reactor,
wherein the process further comprises:
removing, the polychlorosilanes upstream of the gas discharge reactor via the first column inlet of the first column;
removing low boilers downstream of the gas discharge reactor via the second column inlet of the second column;
condensing the low boilers via the condenser of second column outlet of the second column; and
feeding the low boilers to the first column or the gas discharge reactor via the recycle line of the condenser, and wherein the process does not comprise addition of hydrogen.

2. The process according to claim 1, wherein the prepared polychlorosilanes are polyperchlorosilanes having from 2 to 8 silicon atoms and are essentially free of hydrogen.

3. The process according to claim 1, wherein the prepared polychlorosilanes are selected from the group consisting of an ultrahigh-purity hexachlorodisilane, an ultrahigh-purity octachlrotrisilane, an ultrahigh-purity decachlorotetrasilane, an ultrahigh-purity dodecachloropentasilane and a mixture thereof comprising at least two members.

4. The process according to claim 1, wherein the prepared polychlorosilanes are at least one selected from the group consisting of an ultrahigh-purity hexachlorodisilane, an ultrahigh-purity octachlorotrisilane, an ultrahigh-purity decachlorotetrasilane and an ultrahigh-purity dodecachloropentasilane, wherein each of the group member has a titanium content of below 10 ppm.

5. The process according to claim 1, wherein the chlorosilanes are one or more selected from the group consisting of an ultrahigh-purity tetrachlorosilane, an ultrahigh-purity trichlorosilane and an ultrahigh-purity dichlorosilane.

6. The process according to claim 1, wherein the chlorosilane of the formula I that is optionally in a mixture with hexachlorodisilane is introduced into the gas discharge reactor or supplied to the first column.

7. The process according to claim 1, wherein:
the chlorosilane of the formula I and hexachlorodisilane leave the gas discharge reactor via the second column and are condensed in the apparatus using the condenser;
the chlorosilane of the formula I and the hexachlorodisilane are recycled via the recycle line into the first column;
the chlorosilane of the general formula I, optionally in a mixture with hexachlorodisilane, is conducted through the gas discharge reactor; and
the polychlorosilanes having at least two silicon atoms are obtained at a first column outlet of the first column.

8. The process according to claim 1,
wherein:
the chlorosilane of the formula I that is in a mixture with hexachlorodisilane leaves the gas discharge reactor via the second column and is separated from the hexachlorodisilane in the apparatus using the condenser by condensing the hexachlorodisilane;

the chlorosilane of the formula I is recycled via the recycle line into the first column;

the chlorosilane of the formula I is conducted through the gas discharge reactor; and the polychlorosilanes are obtained at a first column outlet of the first column.

9. The process according to claim 1, wherein a pressure of from 300 to 800 $mbar_{abs}$ exists in the gas discharge reactor.

* * * * *